J. P. ROSS.
Straw Cutter.
No. 3,251. Patented Sept. 1, 1843.
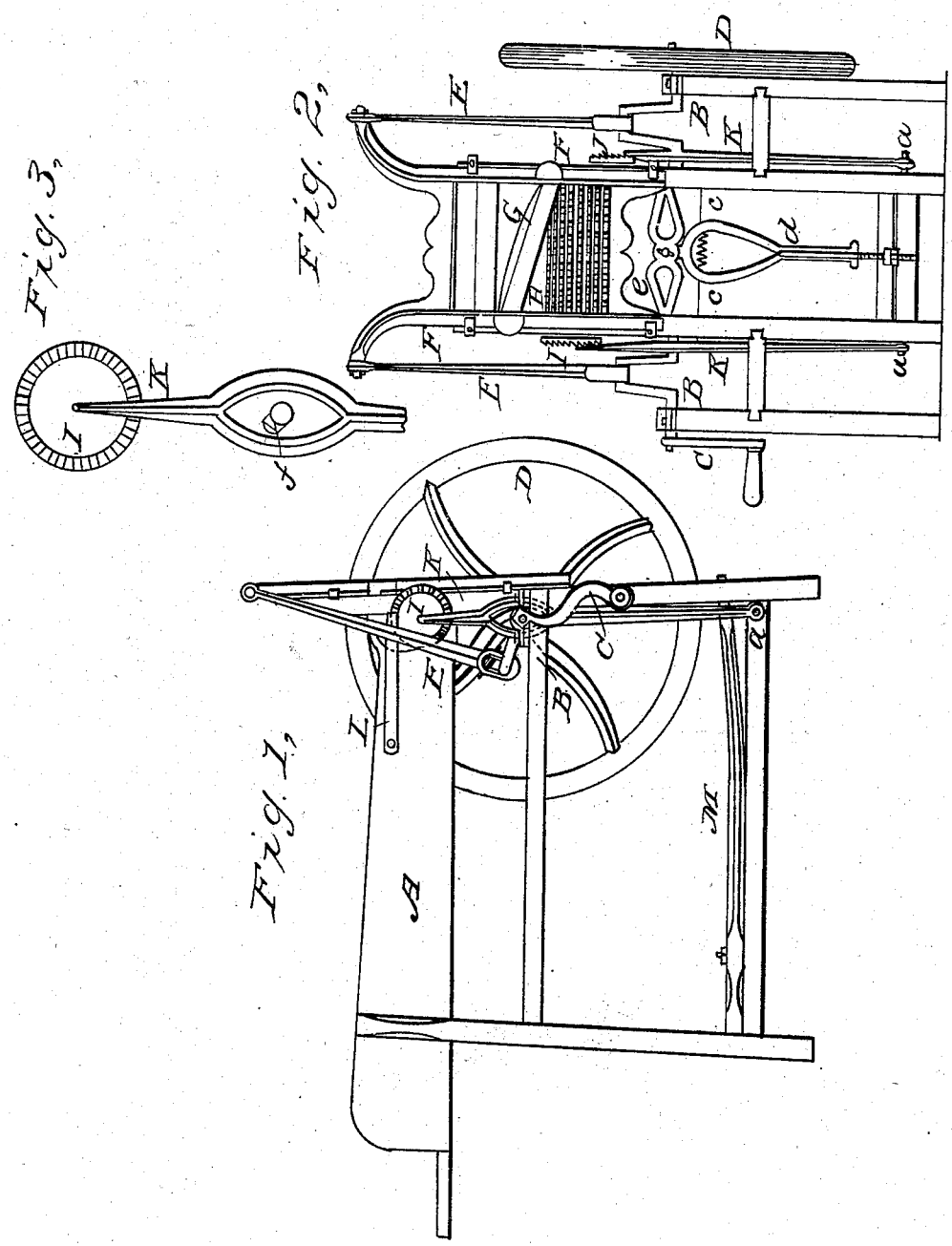

UNITED STATES PATENT OFFICE.

JAMES P. ROSS, OF LEWISBURG, PENNSYLVANIA.

STRAW-CUTTER.

Specification of Letters Patent No. 3,251, dated September 1, 1843; Antedated June 1, 1843.

*To all whom it may concern:*

Be it known that I, J. P. Ross, of Lewisburg, in the county of Union and State of Pennsylvania, have invented a new and useful Improvement in the Manner of Constructing a Machine for Cutting Straw and other Vegetables; and I do hereby declare that the following is a full and exact description thereof.

The general form of my machine is the same with that of many others which have been long known and used; but I have greatly improved the arrangement of the apparatus by which the straw is fed to the knife, and by which the length of the cut may be regulated.

In the accompanying drawing, Figure 1, is a side elevation of my machine, drawn on a scale of one inch to a foot; and Fig. 2, is a front view thereof.

A, is the trough for containing the straw, which trough is furnished at its front, or cutting end, with two feeding rollers, operating in the usual way.

B, is the main shaft, which carries two cranks, and has on one end a winch, C, and on the other a flywheel, D. Two pitmen, E, E, carry the sliding gate, F, with its cutting knife, G. The upper feeding roller, H, has on its axis a crown, or face ratchet wheel, I; and the lower roller a similar wheel on the opposite side of the machine, at J. These ratchet wheels are acted upon by the vibrating bars, K, K, one on each side of the machine; they vibrate on a joint pin, a, at their lower ends; in Fig. 3, the ratchet wheel and one of the vibrating bars are shown, on a scale of two inches to the foot. The main shaft, B, passes through openings, b, in these bars, and is furnished with cams f, which move the bars back and forth. These cams are made to ship and unship, and each machine is furnished with three, or four, sizes, so as to carry the vibrating bars the distance of one, two, three, or four, teeth on the ratchet wheel. Each of the vibrating bars has a tooth on its inner side, which takes into those of the ratchet wheels; said teeth are of such length as to keep in gear, notwithstanding the necessary rise and fall of the rollers.

The bars, K, K, recede, so as to slide over the teeth in their back motion, and they are regulated in their action by a connecting wire, c, c; the middle of which is so coiled as to constitute a spiral spring, seen in Fig. 2. This wire has its two ends attached to the bars, K, K, and it will be seen that they will thereby be made to act freely, and with certainty. L, is a spring pawl which holds the ratchet wheel, each of which is similarly furnished. The upper roller is drawn down by a spring bar, M, acting on the vertical bar, d, which has on its upper end a horizontal bar, e, working on a fulcrum at its middle; its ends enter the lower ends of two stirrups, the upper ends of which embrace the gudgeons of said roller. By allowing the horizontal bar, e, to vibrate on its fulcrum, the action on the upper roller is equalized notwithstanding any inequalities in the thickness of the material to be cut.

I sometimes convert the above described straw cutting machine into a root cutter, by raising the upper roller, putting face boards on the end of the trough, and tilting the latter, so that the roots will slide toward the front, in doing which they will be assisted by the action of the lower feeding roller. The face boards must be so formed as to allow the roots to come under the knife, and to permit the pieces to fall out as they are cut.

Having thus, fully described the nature of my machine for cutting straw, and other vegetables, and shown the manner in which the same operates, what I claim therein as new, and desire to secure by Letters Patent, is—

The manner in which I have combined and arranged the principal, or crank shaft, the ratchet wheels on the gudgeons of the two feeding rollers, the vibrating bars, K, K, and the changeable cams working within the openings in said bars; the respective parts above named coöperating in producing the desired result. I do not claim either of these devices when taken alone, but only in their combination, and general arrangement with each other, substantially as set forth; and this I claim under whatever variation of form they may be used, while the same end is attained by means substantially the same.

JAMES P. ROSS.

Witnesses:
Thos. P. Jones,
Edwin L. Brundage.